US008896527B2

(12) United States Patent  (10) Patent No.: US 8,896,527 B2
Ahn  (45) Date of Patent: Nov. 25, 2014

(54) MULTI-RESOLUTION POINTING SYSTEM

(75) Inventor: Sun H. Ahn, Ladera Ranch, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 653 days.

(21) Appl. No.: 12/419,909

(22) Filed: Apr. 7, 2009

(65) Prior Publication Data

US 2010/0253619 A1  Oct. 7, 2010

(51) Int. Cl.
```
G06F 3/033      (2013.01)
H04N 21/442     (2011.01)
H04N 5/44       (2011.01)
G06F 3/038      (2013.01)
G06F 3/01       (2006.01)
G06F 3/0481     (2013.01)
H04N 21/422     (2011.01)
G06F 3/0346     (2013.01)
G06F 3/0354     (2013.01)
```
(52) U.S. Cl.
CPC ........ *G06F 3/038* (2013.01); *G06F 2203/0384* (2013.01); *H04N 21/44218* (2013.01); *H04N 5/4403* (2013.01); *G06F 2203/04805* (2013.01); *G06F 3/013* (2013.01); *G06F 3/04817* (2013.01); *H04N 21/42202* (2013.01); *H04N 21/42222* (2013.01); *G06F 3/0346* (2013.01); *H04N 21/42224* (2013.01); *G06F 3/012* (2013.01); *G06F 3/03547* (2013.01)
USPC ........... 345/157; 345/160; 345/158; 345/159; 345/161; 345/163; 345/167; 345/168

(58) Field of Classification Search
None
See application file for complete search history.

(56) References Cited

U.S. PATENT DOCUMENTS

| | | | |
|---|---|---|---|
| 4,787,051 A | 11/1988 | Olson | |
| 5,898,421 A | 4/1999 | Quinn | |
| 5,945,979 A * | 8/1999 | Rutledge et al. | 345/161 |
| 5,956,019 A | 9/1999 | Bang et al. | |
| 6,809,722 B2 | 10/2004 | Mei et al. | |
| 6,909,422 B2 | 6/2005 | Yokoji et al. | |
| 7,239,301 B2 | 7/2007 | Liberty et al. | |
| 2005/0190144 A1* | 9/2005 | Kong | 345/156 |
| 2006/0119572 A1* | 6/2006 | Lanier | 345/156 |
| 2007/0080940 A1* | 4/2007 | Aoki et al. | 345/158 |
| 2008/0174570 A1* | 7/2008 | Jobs et al. | 345/173 |
| 2008/0318677 A1* | 12/2008 | Ohta | 463/36 |
| 2010/0066694 A1* | 3/2010 | Jonsdottir | 345/173 |
| 2010/0079449 A1* | 4/2010 | McCarthy | 345/419 |
| 2010/0156805 A1* | 6/2010 | Brand et al. | 345/173 |

* cited by examiner

*Primary Examiner* — Joseph Haley
*Assistant Examiner* — Ifedayo Iluyomade
(74) *Attorney, Agent, or Firm* — IP Investment Law Group

(57) ABSTRACT

A user control input system for a host with a display. A controller establishes a communication link with the host and includes a first motion sensor. At least a second motion sensor is also in communication with the host. First user movement induces the first motion sensor to generate a first signal that is communicated to the host such that the host induces movement of a cursor on the display to move with respect to control objects at a first resolution. Second user movement induces the second motion sensor to generate a signal that is communicated to the host such that the host processing unit induces movement of the cursor at a second coarser resolution. The cursor can include first and second indicia such that the second indicium is moved proportional to the second motion at a finer resolution than movement of the first indicia.

20 Claims, 6 Drawing Sheets

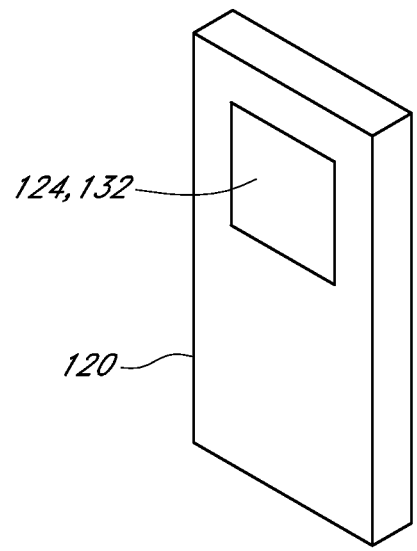
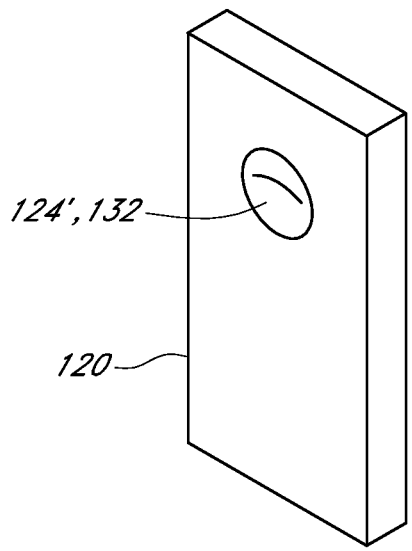
FIG. 2A  FIG. 2B
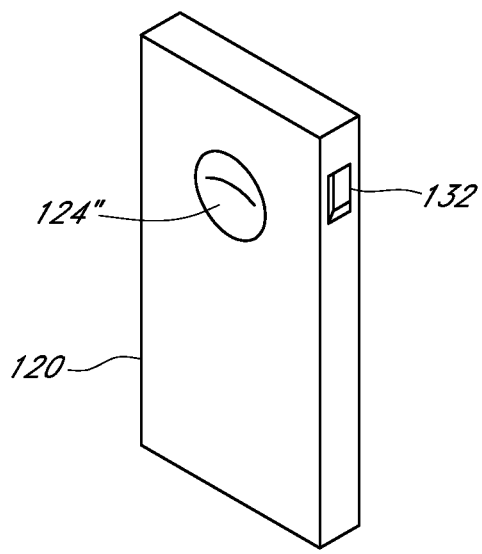
FIG. 2C

MULTI-RESOLUTION POINTING SYSTEM

BACKGROUND OF THE INVENTION

1. Field of the Invention

The invention relates to the field of interface controls for electronic devices and to a pointing device(s) and system having multiple pointing resolutions.

2. Description of the Related Art

A variety of input or control devices have been developed for interaction with microprocessor or computer based electronic devices. For example, keyboards have been developed to enter text base data, which can include commands, to an electronic device. Buttons and switches have also been developed to allow a user to indicate or select a desired operating condition or other control parameter. Graphical user interfaces (GUI) have also been developed to provide a user friendly and intuitive interface for providing control inputs. A GUI system typically includes a graphical display that portrays one or more control icons and a user moveable and selectable cursor that is moved about the display. Via the moveable cursor, a user can select or indicate a control icon and select a desired control action.

GUI systems have employed a variety of interfaces for interacting with the GUI system to move and select the cursor as displayed on the display screen. A mouse can have a wired or wireless connection to the electronic device. Physical movement of the mouse, for example on a table, desk, mouse pad, and the like, are translated into corresponding movements of the cursor. A button or pressure switch is typically provided to allow a user to activate or "click" the cursor when moved to the desired location. Trackballs work in a similar manner, however movement of the cursor is induced via rotational movement of the trackball rather than the gross movement of a mouse. Track pads or mouse pads allow a user to trace or swipe their fingertip across the pads to effect movement of the cursor. Tapping on the track pad or activation of a separate switch activates or clicks the cursor. Electronic devices can also be provided with touch screens such that a user may indicate directly on a display the desired control icon and corresponding control input. Such systems have been well developed and typically work well for the desired applications when the mouse, trackball, and/or touch screen are integrated with or located in close proximity to the electronic device.

Certain categories of electronic device however are typically not equipped to offer the proximity of a GUI as has been provided, for example, in computers and personal mobile devices. For example, a television is typically not configured to have a user in close proximity to the device during operation. In contrast, a television is typically configured for the user to sit or otherwise view the television from a range of several meters. Accordingly, a variety of remote controls have been developed that communicate with a television in a wireless manner and facilitate control and operation of the television from a range of several meters. Remote controls can provide the user the ability to remotely select a desired viewing channel, adjust sound volume, adjust a variety of video display options, and/or select from a variety of input sources. However, remote controls have not supported a graphical user interface. As televisions develop increased capabilities, including the capabilities to act as components in an Internet connected smart system, existing interface and control systems have offered limited utility and convenience for the user.

SUMMARY OF THE INVENTION

Embodiments are based at least in part on a recognition that a new type of interface system is needed to accommodate the user control needs of complex electronic devices that may include a relatively large display screen, particularly in applications where a user is generally located not in immediate proximity to the electronic device. Embodiments include pointing device systems to allow a user to graphically indicate objects on a display screen and apply desired actions to those objects. Some embodiments employ a handheld portable controller that can include one or more motion sensors. Embodiments include user input systems or pointing devices having multiple resolutions.

Some embodiments include sensors having a relatively coarse movement resolution configured to induce movement of a cursor on a display screen proportional to gross body movements, for example movement of a hand, eyes, and/or head. The coarse resolution can allow a user to rapidly move a cursor on a display screen, for example to rapidly traverse substantially an entire extent of a display screen. Embodiments can also include relatively fine or high resolution motion sensors. The high resolution sensor allows a user to have relatively fine and precise control over a cursor in a GUI system. By combining multiple resolutions in a pointing device system, a user can maintain the precision and control of high resolution movement of a cursor with reduced inconvenience from a strictly fine resolution based system.

For example, when adapted to relatively large display screens, existing GUI interfaces would either sacrifice fine motion control or require a user to repeatedly or iteratively sweep across a graphical user interface with each swipe or sweep only moving a cursor a portion of a distance across a larger display screen. Embodiments employ multiple motion sensing technologies to easily and rapidly locate and indicate a region of interest, such as a particular control icon. Embodiments use relatively high resolution technology to accurately select or point items within the region of interest. Objects or items within an area of interest can be enlarged for improved visibility, particularly from an extended viewing distance.

One embodiment includes a user control input system comprising a host processing unit, a display in communication with the host processing unit and configured to graphically display data and control objects, a controller processing unit, a communication link between the controller processing unit and the host processing unit, a first motion sensor in communication with the host processing unit, and at least a second motion sensor in communication with the host processing unit and wherein first user movement induces the first motion sensor to generate a first signal that is communicated to the host processing unit such that the host processing unit induces movement of a cursor displayed on the display to move with respect to the control objects at a first resolution and wherein second user movement induces the second motion sensor to generate a signal that is communicated to the host processing unit such that the host processing unit induces movement of the cursor at a second coarser resolution.

Another embodiment includes a controller for providing control signals to a separate electronic device, the controller comprising a controller processing unit, a communication module for wireless communication with a separate electronic device and in communication with the controller processing unit, a first motion sensor in communication with the controller processing unit, and at least a second motion sensor in communication with the controller processing unit wherein first user movement with respect to the controller induces the first motion sensor to generate a first signal corresponding to movement of a first resolution and wherein second user movement induces the second motion sensor to generate a second signal corresponding to movement of a second coarser resolution.

A further embodiment includes a method of providing control inputs to an electronic device, the method comprising presenting a graphical depiction of a plurality of control icons on a display screen, generating a first movement signal corresponding to a first user movement, moving a cursor on the display screen corresponding to the first movement signal at a first resolution, generating a second movement signal corresponding to a second user movement, and moving the cursor on the display screen corresponding to the second movement signal at a second coarser resolution.

Yet a further embodiment includes computer readable storage media provided with machine executable instructions that induce one or more microprocessor based devices to perform the operations of display a plurality of control icons distributed on a display screen, receive first signals indicative of a first motion, move a first indicia on the display screen proportional to the first motion, receive second signals indicative of a second motion, and move a second indicia on the display screen proportional to the second motion wherein the movement of the second indicia is performed at a finer resolution than movement of the first indicia. These and other objects and advantages of the invention will become more apparent from the following description taken in conjunction with the accompanying drawings.

BRIEF DESCRIPTION OF THE DRAWINGS

FIGS. 2A, 2B, and 2C are perspective schematic illustrations of embodiments of handheld portable controllers adapted for use in a multi-resolution pointing system.

DETAILED DESCRIPTION OF THE PREFERRED EMBODIMENT

Figure 1:
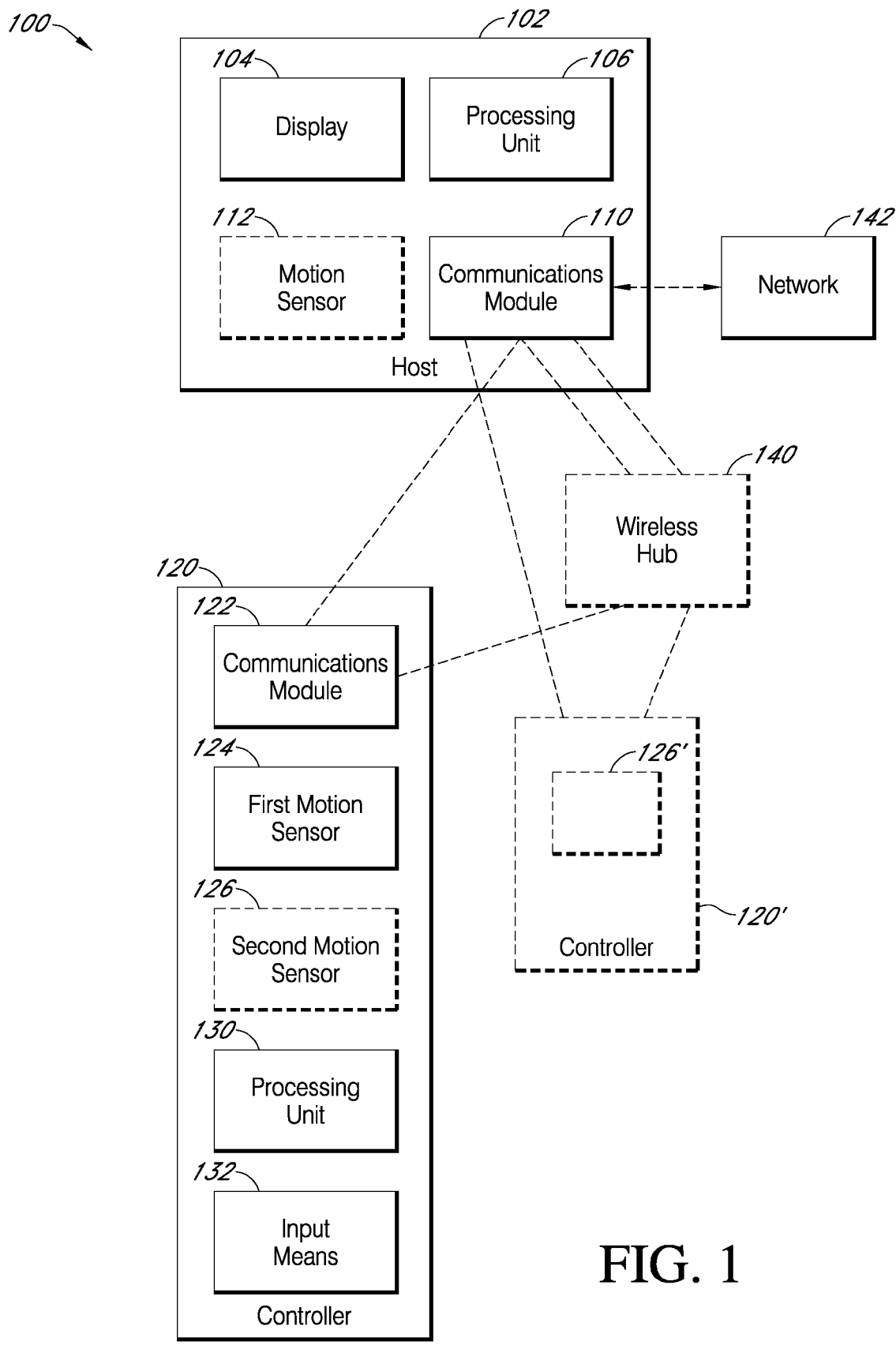
FIG. 1 is a schematic block diagram of embodiments of a multi-resolution pointing system which can include one or more controllers with first and second motion sensors.

FIG. 1 is a block diagram of embodiments of a multi-resolution pointing system 100. The system 100 is configured to allow a user to interact with a host 102 so as to provide control inputs to induce the host 102 to perform desired operations. The host 102 can comprise a variety of electronic devices including but not limited to computers, televisions, and televisions including set top boxes for multi-media access, and computers and/or televisions having Internet and/or local area network (LAN) connectivity. The system 100 is configured to allow the user to interact with the host 102 via a graphical user interface (GUI) that allows rapid access to a plurality of graphic control objects distributed across a large display area, yet in a manner that supports high accuracy or resolution operation with the control objects.

The host 102 comprises one or more displays 104. The display 104 is configured to graphically portray image data for viewing by a user. The display 104 can comprise a variety of technologies including but not limited to cathode ray tubes (CRTs), liquid crystal displays (LCDs), plasma displays, DLP displays, light emitting diode (LED) displays, organic LEDs (OLEDs), and/or interferometric modulators. In some embodiments, the display 104 has a relatively large viewing area, including but not limited to displays 104 having viewing dimensions of one or more meters.

The host 102 also comprises one or more processing units 106. The processing unit 106 comprises one or more microprocessors and associated operational software and memory. Thus the processing unit 106 comprises at least in part computer readable storage media provided with machine executable instructions to induce a computer based system to perform associated operations.

The host 102 further comprises a communications module 110. The communications module 110 supports wired and/or wireless communication with one or more other electronic devices. The communications module 110 can utilize a variety of communications technology, including but not limited to RF signals, IR signals, fiber optic communication channels, and wired communications channels. The host 102 can be in communication with a wireless hub 140 configured to support wireless communication with other devices in the local environment. The host 102 can also be in communication with a network 142. The network 142 can be adapted to provide programming data, such as a plurality of television channels, and/or provide connection to other distributed communication systems, such as the Internet.

The system 100 further comprises one or more controllers 120, 120'. The controller 120 is configured to allow a user to provide control inputs to the host 102 in a remote manner. Thus, the controller 120 is configured to support communication with the host 102 over an extended distance, generally on the order of several meters or more. The controller 120 comprises a communications module 122 configured for communication with the host 102, e.g. via cooperation with the host communications module 110. In some embodiments, the controller 120 can communicate with the host 102 via the wireless hub 140.

The controller 120 comprises a first motion sensor 124. The first motion sensor 124 is configured to provide signals indicative of user movement that is generally made with respect to the controller 120. The first motion sensor 124 can comprise a variety of sensors including but not limited to touch pads, mouse pads, trackballs, wireless mice, and touch screens. The first motion sensor 124 is configured to provide relatively fine or precise signals corresponding to the user's movement. For example, a user may swipe or trace their fingertip across a track pad thereby generating a signal indicative of the relative two dimensional movement of the user's fingertip across the touch pad. This signal is communicated, in one embodiment, by the controller communications module 122 to the host communications module 110.

The controller 120 can comprise at least a second motion sensor 126. The second motion sensor 126 can be configured to generate signals indicative of the movement of the controller 120. Thus, in some embodiments, user manipulation or movement of the controller 120 generates signals indicative thereof. Thus, the second motion sensor 126 generates signals indicative of gross movement of the user and the controller 120. As the movement signals generated by the second motion sensor 126 can correspond to gross or relatively large movements of the user and the controller 120, resolution or precision of these signals generated by the second motion sensor 126 may be relatively coarse or imprecise. The second motion sensor 126 can comprise a variety of motion sensors including but not limited to one or more accelerometers and/or one or more gyroscopes.

Some embodiments comprise a first controller 120 and at least a second controller 120'. The second controller 120' can comprise a second motion sensor 126 and the first controller 120 comprises a first motion sensor 124 without a second motion sensor. The second motion sensor 126 of the second controller 120' can comprise a motion sensor adapted for movement with a users head. For example, the second controller 120' can be configured for mounting to a user's head, such as via bands, straps, or a cap. Tilting and/or rotation of the user's head and thus the second controller 120' can induce the second motion sensor 126 to generate a corresponding signal.

In some embodiments, the host 102 can comprise one or more motion sensors 112. The host motion sensor(s) 112 can be configured to sense one or more movements of a user. In some embodiments, the host motion sensor(s) 112 comprise an eye-movement sensor. In these embodiments, the host motion sensor 112 can track movement of the user's eyes and generate corresponding motion signals. In some embodiments, the host motion sensor(s) 112 comprise machine vision sensors to allow the host 102 to track movement of the user, including but not limited to movement of their head and hands.

In some embodiments, the system 100 comprises three or more motion sensors. For example, in some embodiments the system comprises a first motion sensor 124 configured to provide fine or high resolution motion signals. The system 100 can comprise a third host motion sensor 112 configured to detect relatively coarse or low resolution motion signals, for example corresponding to a user's eye movement. The system 100 can comprise a second motion sensor 126 embodied in a first controller 120, a second controller 120', or in the host 102. The second motion sensor 126 is configured to provide intermediate resolution motion signals corresponding, for example, to movement of a user's head or hand. Thus embodiments provide wide flexibility in configuring a plurality of motion sensors to generate a plurality of motion signals having varying resolution or precision.

In some embodiments, the system 100 is configured such that the host 102 operates on signals from the first and at least second motion sensors 124, 126 independently and exclusively. Thus, in at least some embodiments, the host 102 may ignore or disregard signals from the first motion sensor 124 when operating on signals from the second motion sensor 126. Conversely, the host 102 can be configured to ignore signals from the second motion sensor 126 when processing signals from the first motion sensor 124. Thus, in at least some embodiments, inadvertent or unintentional movement of the controller 120 or of the user while operating the first motion sensor 124 can be ignored or suppressed by the system 100. This aspect allows a user to provide fine or high resolution control inputs that are not disrupted or overridden by incidental gross or coarse movement signals.

In one embodiment, the controller 120 further comprises a controller processing unit 130. The controller processing unit 130 comprises one or more microprocessors and associated operating software and memory. The processing unit 130 comprises storage media provided with machine executable instructions configured to perform a variety of processes, including those described for various embodiments herein.

In some embodiments, the controller 120 further comprises one or more input means 132. The input means 132 provide one or more operational controls for a user to provide control inputs. The input means 132 can be configured as a button or switch. The input means 132 can also comprise a pressure sensor. For example, applying pressure to a button or region of the controller 120 can result in a "clicking" control input. In some embodiments, the input means 132 can be at least partially integrated with one or both of a first and second motion sensor 124, 126. For example, as previously noted the first motion sensor 124 can comprise a touch pad and/or trackball. The input means 132 can be configured such that applying a specific pressure or tap motion to the first motion sensor 124 can result in activation of the input means 132. In a similar manner, the first motion sensor 124 can comprise a trackball and tapping or applying a vertical force to the trackball can induce activation of the input means 132.

FIGS. 2A, 2B, and 2C illustrate various embodiments in perspective view of a controller 120 in a multi-resolution pointing system 100. FIG. 2A illustrates an embodiment of controller 120 comprising a first motion sensor 124 and input means 132 configured as a touch pad. As previously described, a user can trace or swipe their finger across the surface of the first motion sensor 124 thereby generating a signal indicative of the two dimensional movement of the user's fingertip across the first motion sensor 124. The user can also apply a specific tactile input, such as brief tapping or striking of the first motion sensor 124 to activate the input means 132. In some embodiments, the first motion sensor 124 and input means 132 can be configured such that application of a greater force throughout a swiping motion or at the beginning of a swiping motion can result in the first motion sensor 124 and input means 132 providing a signal indicating a desire for a "drag" input command. In some embodiments, the first motion sensor 124 and input means 132 can generate different movement signals depending on whether a user swipes a single fingertip across the first motion sensor or multiple fingertips in concert.

FIG. 2B illustrates an embodiment of controller 120 having a first motion sensor 124' and input means 132 configured as a trackball. As previously noted, the first motion sensor 124' operates via a rolling or rotating action of the trackball rather than swiping across the first motion sensor 124 configured as a trackpad. Tapping or application of force to the first motion sensor 124' configured as a trackball can activate an input means 132 to effect a clicking or selection operation with the controller 120.

FIG. 2C illustrates an embodiment of controller 124 comprising a trackball 124" and a separate input means 132. While FIG. 2C illustrates a single input means 132 arranged generally at an upper outward corner of the controller 120, it will be understood that this is simply one embodiment. A plurality of input means 132 having separate control functions can be provided. In addition, the location of the one or more input means 132 can be adjusted to the needs of a given application.

Figure 3:
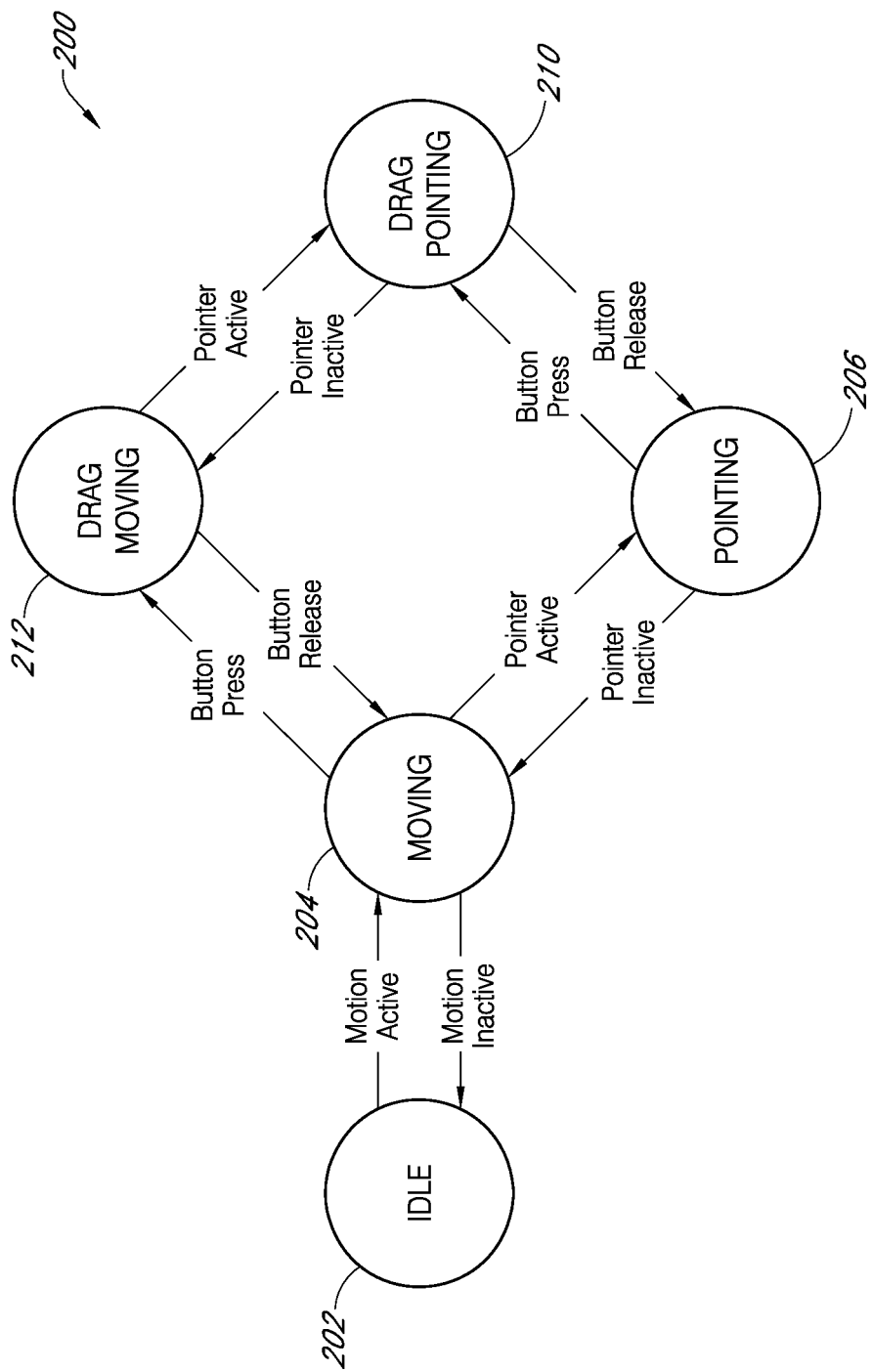
FIG. 3 is a state diagram of embodiments of a multi-resolution pointing system.

FIG. 3 is a state transition diagram of embodiments of a multi-resolution pointing system 100. In an idle state 202, the multi-resolution pointing system 100 is inactive. In state 202, the host 102 either does not receive any motion data or any received motion data fails to exceed a movement threshold. The idle state 202 does not indicate that the host 102 or controller 120 is necessarily in an inoperative or in an "off" mode, but rather simply that no significant user motion activity is currently present.

Upon the host 102 recognizing a motion active condition, the idle state 202 transitions to a moving state 204. The moving state 204 indicates that one or more gross motions of the user have been detected by one or more of the second motion sensor 126 of the controller 120, a motion sensor 112 of the host, or a motion sensor of an additional controller 120'.

The motion active condition can be defined differently depending on particular implementations of various embodiments of the system 100. For example, in some embodiments a motion active condition occurs according to a significant gross motion activity followed by a brief pause in motion. For example, this embodiment can correspond to a user action of lifting the controller 120 and aiming or pointing the controller 120 generally in the direction of the physical location of the host 102. In some embodiments, a motion active condition can occur via the user action of powering on the controller 120.

A motion inactive condition can occur in a time-out manner. For example, if significant motion in excess of the threshold is not observed for a selected interval of time, the system 100 can transition in a motion inactive condition from the moving state 204 to the idle state 202.

Figure 4:
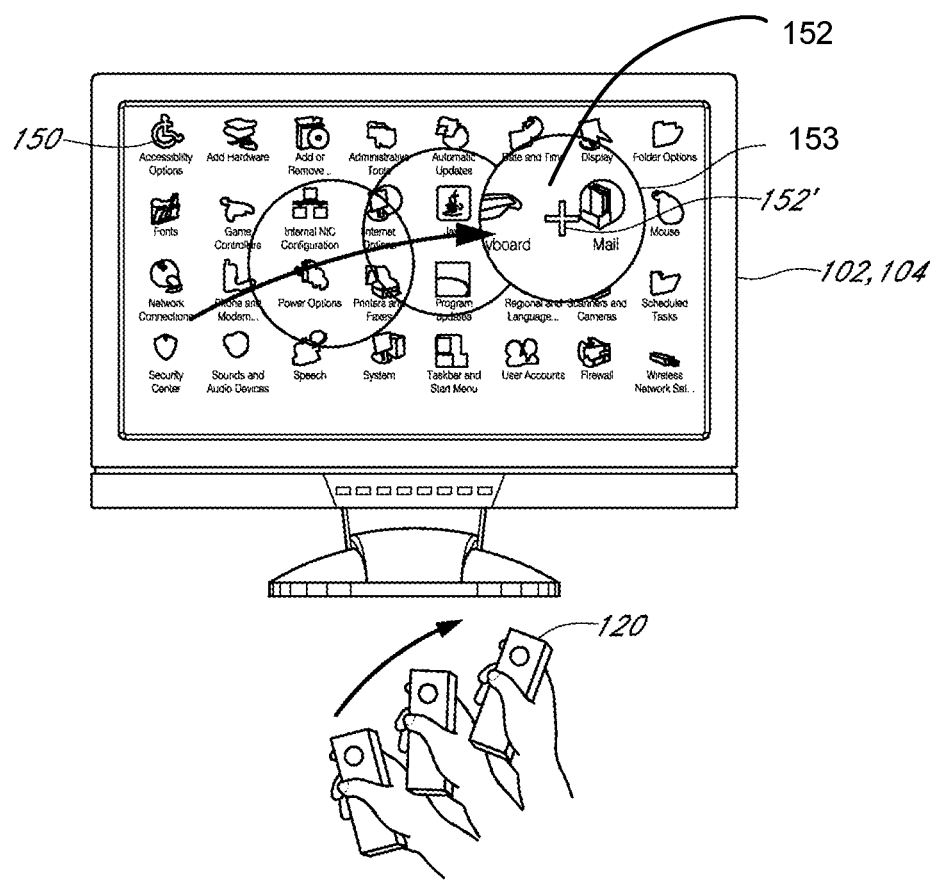
FIG. 4 illustrates embodiments of coarse cursor movements in a multi-resolution pointing system corresponding to a second motion sensor.

In the moving state 204, the host 102 recognizes and processes one or more motion signals corresponding to gross movement of the user. For example, a user can hold and manipulate a controller 120 with or without operating the first motion sensor 124. In the moving state 204, gross movements observed by the system 100 result in generation and corresponding movement of a cursor. For example as illustrated in FIG. 4, a host 102 including a display 104 can generate graphic depictions of a plurality of control icons 150. The host 102 can further generate and graphically depict a cursor 152 corresponding to movement observed during the moving state 204. In one embodiment, the cursor 152 comprises a highlighted or spotlighted area depicted at a first initial region of the display 104. In one embodiment, the cursor 152 describes a generally circular highlighted or spotlighted area. However this is simply one embodiment and other sizes, shapes, and configurations of the cursor 152 are possible.

In some embodiments, the cursor 152 comprises a composite cursor. Thus, in at least one embodiment the cursor 152 describes an outer boundary 153 or region of the cursor 152 and a cursor portion 152' indicating a center of the composite cursor.

In some embodiments, the cursor 152 can be enlarged or zoomed in for better visibility. As previously noted, in at least some implementations the display 104 of the host 102 is relatively large. A cursor 152 can be enlarged or zoomed to offer a user a better view of regions of the display 104 of interest.

In the moving state 204, the host 102 receives motion data and induces the cursor 152 into corresponding movement across the display 104. In some embodiments, the motion sensor(s) monitored during the moving state 204 can have relatively low accuracy or resolution. Accordingly, the host 102 can interpret motion signals indicative of gross movement of the user/controller 120 in a macroscopic or relatively low resolution manner. This aspect provides the advantage that motion signals can be utilized to move the cursor 152 in a relatively quick and rapid manner across a substantial entire extent of the display 104. Thus, a relatively quick single swing of the controller 120 can result in the cursor 152 traversing from one extent of the display 104 to an opposite limit of the display 104. For example, a user can induce movement of the cursor 152 from a lower left corner of the display 104 to an upper right corner of the display 104 via a single sweep motion of the controller 120.

As previously noted, the cursor 152 can automatically enlarge or zoom control icons 150 falling within the extent of the cursor 152. This enlargement or zooming can occur dynamically as the cursor 152 traverses the display 104. This aspect can provide the advantage of providing improved view of the control icons 150 as the user induces movement of the cursor 152 about the display 104.

When a user activates the first motion sensor 124, the system 100 transitions to a pointing state 206. In the pointing state, the host 102 recognizes signals from the first motion sensor 124. In the pointing state 206, the user manipulates the first motion sensor 124 without activation of the input means 132. In some embodiments, the host 102 operates to adjust the position of the cursor 152 in a fine or high resolution manner. As previously noted, in at least some embodiments, motion sensors recognized in the moving state 204 can be relatively imprecise or coarse in resolution. In the pointing state 206 however, the first motion sensor 124 can provide relatively precise and high resolution motion signals, facilitating fine or high resolution adjustment of the location of the cursor 152.

Figure 5A:
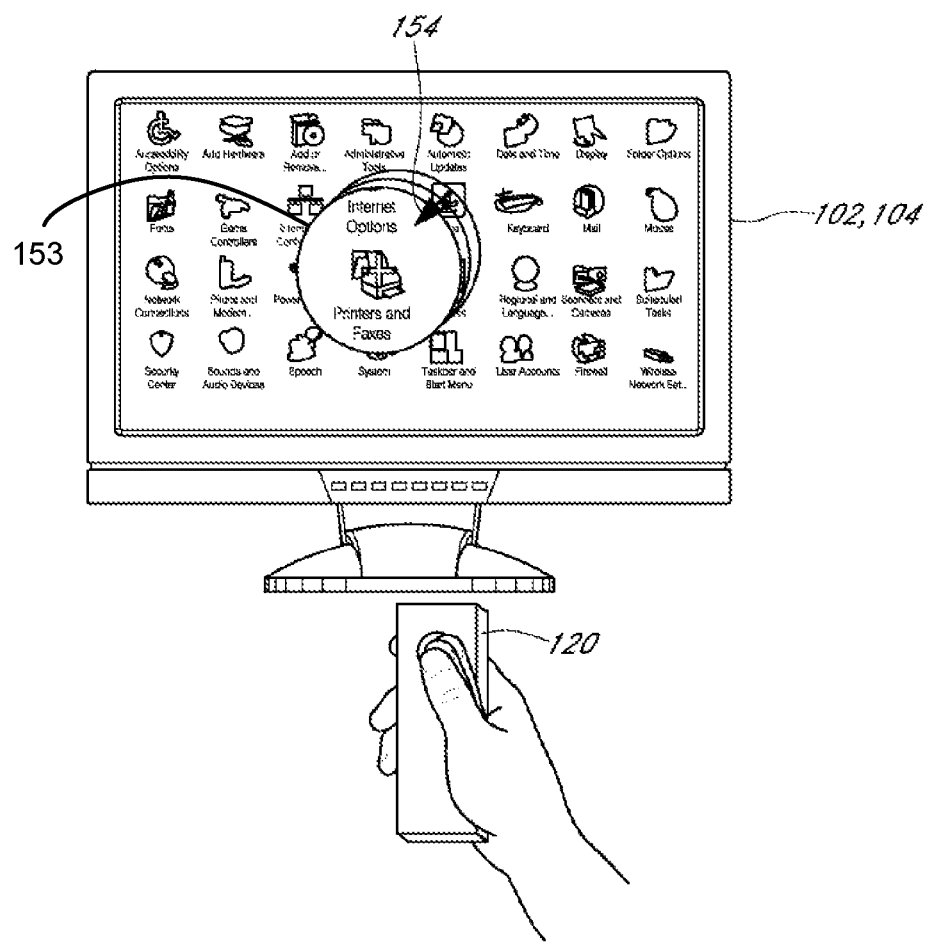
FIGS. 5A and 5B illustrate embodiments of relatively fine cursor movement in a multi-resolution pointing system corresponding to a first motion sensor.
Figure 5B:
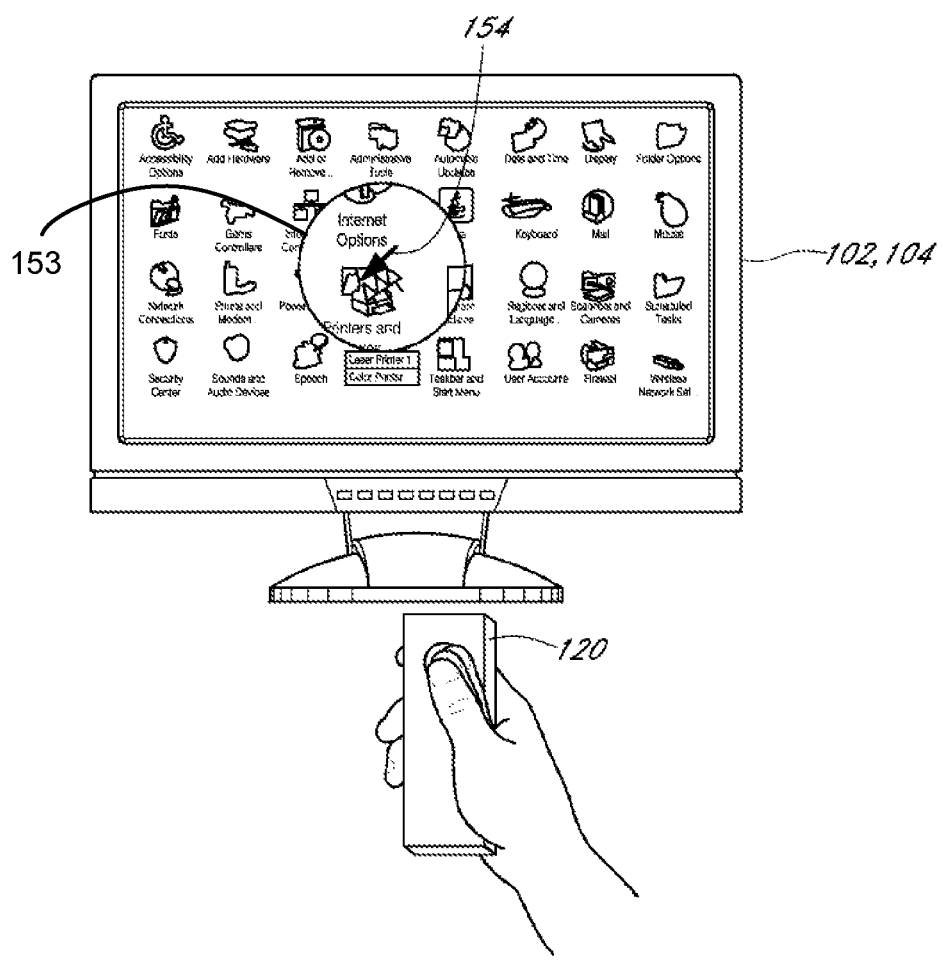

In some embodiments, the pointing state 206 induces the host 102 to generate and display a second cursor or pointer 154 (FIGS. 5A and 5B). The pointer 154 can be initially located generally at the center of the cursor 152. The pointer 154 can be encompassed by the outer boundary 153 and move relative to and within the outer boundary 153. The pointer 154 can move away from the center of the cursor 152 without moving the outer boundary 153. The pointer 154 can be used to select a desired control icon 150 and induce the host 102 to perform the associated operations. The pointer 154 in some embodiments when selected induces the control icon 150 to present a pull-down or popup menu offering the user a plurality of control options associated with the control icon 150.

In the pointing state 206, the host ignores or disregards motion signals that are recognized in the moving state 206. Since the host 102 disregards or ignores gross motion signals in the pointing state 206, inadvertent user movement or controller 120 movement does not disrupt the fine or high resolution motion signals provided by the first motion sensor 126. Thus, the user can continue to provide fine high resolution motion signals to the host 102 without these signals being overridden or disrupted by gross movement either by the user or of the controller 120.

In some embodiments, when the user releases the pointing sensor, e.g. the first motion sensor 124, a pointer inactive condition is recognized and the system 100 transitions from the pointing state 206 back to the moving state 204.

From the pointing state 206, if the system 100 recognizes user actuation of the input means 132, a button press condition is recognized and the system 100 transitions to a drag pointing state 210. In the drag pointing state 210, the host 102 selects any control icon 150 centered within the cursor 152 or aligned with the pointer 154. Further user actuation of the first motion sensor 124 results in signals inducing the host 102 to move the selected control icon 150 in a corresponding manner. Thus, the drag pointing state 210 allows a user to select and "drag" the cursor 152 and/or pointer 154 and any associated control icons 150. Release of the input means 132 causes a button release condition to be recognized and the system 100 transitions back to a pointing state 206.

In a similar manner, activation of the input means 132 in the moving state 204 results in a button press condition being recognized. The system 100 transitions from the moving state 205 to the drag moving state 212. The drag moving state 212 operates in a similar manner as previously described for the drag pointing state 210. However, movement or dragging of control icons 150 and operation therewith occurs according to one or more of the gross motion sensors rather than the fine high resolution first motion sensor 124.

It will be understood that the state diagram illustrated in FIG. 3 and the associated description is simply descriptive of certain embodiments. For example, in some embodiments, one or both of the drag pointing 210 and drag moving 212 states can be omitted. Additional states can also be implemented in some embodiments. For example, a clear state can be implemented to cancel or negate previously indicated actions. For example, vigorous shaking or inversion of the controller 120 can result in the system entering a clear state to cancel or negate a previously indicated control input.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A user control input system comprising:
   a host processing unit;
   a display in communication with the host processing and configured to graphically display data and control objects;
   a controller processing unit,
   a communication link between the controller processing unit and the host processing unit;
   a first motion sensor, coupled with the host processing unit, configured to provide a first signal for inducing movement of a first cursor portion of a composite cursor displayed on the display at a fine resolution for representing a first movement; and
   at least a second motion sensor, coupled with the host processing unit, configured to provide a second signal for inducing movement of a second cursor portion of the composite cursor at a second resolution coarser than the fine resolution with the second resolution for representing a second movement, the second cursor portion encompassing the first cursor portion with the first cursor portion moving relative to and within the second cursor portion, wherein the first cursor portion is for selecting a desired enlarged control item within the second cursor portion.

2. The user control input system of claim 1, wherein the first motion sensor and the controller processing unit are embodied in a single same portable controller.

3. The user control input system of claim 2, wherein the at least second motion sensor is also embodied in the single same portable controller.

4. The user control input system of claim 2, wherein the at least second motion sensor is embodied in a separate second portable controller.

5. The user control input system of claim 1, wherein the second motion sensor, the display and the host processing unit are embodied in a single same host device.

6. The user control input system of claim 1, wherein the second motion sensor is configured to detect gross movement of a user's hand.

7. The user control input system of claim 1, wherein the second motion sensor is configured to detect movement of a user's eyes.

8. The user control input system of claim 1, wherein the second motion sensor is configured to detect movement of a user's head.

9. The user control input system of claim 1, further comprising at least a third motion sensor configured to generate a third signal with the host processing unit inducing movement of the cursor at a third intermediate resolution.

10. The user control input system of claim 1, wherein the host processing unit operates as a state machine with respect to movement of the cursor at the fine resolution or the second resolution.

11. The user control input system of claim 1, further comprising an input such that a combination of activation of the input and one of the first and second signals results in a drag operation of the cursor.

12. A controller for providing control signals to a separate electronic device, the controller comprising:
    a controller processing unit;
    a communication module for wireless communication with a separate electronic device and in communication with the controller processing unit;
    a first motion sensor, coupled with the controller processing unit, configured to provide a first signal for inducing movement of a first cursor portion of a composite cursor displayed on a display at a fine resolution for representing a first movement;
    at least a second motion sensor, coupled with the controller processing unit, configured to provide a second signal for inducing movement of a second cursor portion of the composite cursor at a second resolution coarser than the fine resolution with the second resolution for representing a second movement, the second cursor portion encompassing the first cursor portion with the first cursor portion moving relative to and within the second cursor portion, wherein the first cursor portion is for selecting a desired enlarged control item within the second cursor portion.

13. The controller of claim 12, wherein the second signal is generated corresponding to movement of the controller.

14. The controller of claim 12, wherein the at least second motion sensor comprises one or more of a gyroscope and an accelerometer.

15. The controller of claim 12, wherein the first motion sensor comprises one or more of a track pad, a track ball, and a wireless mouse.

16. The controller of claim 12, further comprising an input such that a combination of activation of the input and one of the first and second signals results in a corresponding drag signal.

17. The controller of claim 12, wherein the first and second signals are generated such that the separate electronic device can operate on the first and second signals in an exclusive OR logic.

18. A method of providing control inputs to an electronic device, the method comprising:
    presenting a graphical depiction of a plurality of control icons on a display screen;
    generating a first movement signal for corresponding to a first movement;
    moving a first cursor portion of a composite cursor on the display screen corresponding to the first movement signal at a fine resolution;
    generating a second movement signal for corresponding to a second movement; and
    moving a second cursor portion of the composite cursor on the display screen corresponding to the second movement signal at a second resolution coarser than the fine resolution, the second cursor portion encompassing the first cursor portion with the first cursor portion moving relative to and within the second cursor portion, wherein the first cursor portion is for selecting a desired enlarged control item within the second cursor portion.

19. The method of claim 18, further comprising:
    generating a third movement signal corresponding to a third movement; and
    moving the cursor on the display screen corresponding to the third movement signal at a third intermediate resolution.

20. A non-transitory computer-readable storage medium provided with machine executable instructions that induce one or more microprocessor based device to perform the operations of:
  generating a composite cursor including a second cursor portion encompassed by a first cursor portion for displaying on a display;
  receiving first signals for representing a first motion;
  moving the first cursor portion at a resolution based on the first signals;
  receiving second signals for representing a second motion; and
  moving the second cursor portion within and relative to the first cursor portion at a finer resolution than the first cursor portion, wherein the second cursor portion for selecting a desired enlarged control item within the first cursor portion.

* * * * *